(12) United States Patent
Kaneda

(10) Patent No.: US 6,927,798 B2
(45) Date of Patent: Aug. 9, 2005

(54) LIGHT AMOUNT ADJUSTING APPARATUS AND OPTICAL APPARATUS HAVING THE SAME

(75) Inventor: Naoya Kaneda, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 757 days.

(21) Appl. No.: 09/861,771

(22) Filed: May 22, 2001

(65) Prior Publication Data

US 2002/0008772 A1 Jan. 24, 2002

(30) Foreign Application Priority Data

May 24, 2000 (JP) ........................................ 2000-152805

(51) Int. Cl.$^7$ .......................... H04N 5/238; H04N 5/225
(52) U.S. Cl. ...................... 348/363; 348/342; 348/224.1
(58) Field of Search ................. 348/363, 362, 348/342, 224.1, 221.1; 396/450, 505; 359/888

(56) References Cited

U.S. PATENT DOCUMENTS

| | | | | |
|---|---|---|---|---|
| 5,173,807 A | | 12/1992 | Kaneda et al. ............... 359/698 |
| 5,293,542 A | * | 3/1994 | Ise et al. ..................... 348/363 |
| 5,479,298 A | | 12/1995 | Yanagi et al. | |
| 5,764,292 A | * | 6/1998 | Yamaguchi ................. 348/363 |
| 5,796,531 A | | 8/1998 | Kaneda et al. ............... 359/832 |
| 5,825,545 A | | 10/1998 | Kino et al. .................. 359/557 |
| 5,828,503 A | | 10/1998 | Kaneda et al. ............... 359/824 |
| 6,002,885 A | | 12/1999 | Kaneda ........................ 396/72 |
| 6,016,221 A | | 1/2000 | Kaneda et al. ............... 359/557 |
| 6,046,768 A | | 4/2000 | Kaneda et al. ............... 348/208 |
| 6,356,304 B1 | * | 3/2002 | Kawaguchi et al. ..... 348/222.1 |
| 6,533,473 B1 | * | 3/2003 | Edamitsu et al. ........... 396/450 |
| 2004/0130653 A1 | * | 7/2004 | Nanjo et al. ................ 348/363 |

FOREIGN PATENT DOCUMENTS

JP 04345149 A * 12/1992 ............ G03B/9/02

* cited by examiner

*Primary Examiner*—Aung Moe
(74) *Attorney, Agent, or Firm*—Fitzpatrick, Cella, Harper & Scinto

(57) ABSTRACT

A light amount adjusting apparatus is constructed by a driving source, a plurality of light shielding members each having a notched portion adapted to form a light passing port, in which the light shielding member is moved by being driven by the driving source to thereby vary an area of the light passing port which is formed in the notched portion, and at least one filter provided for the notched portions of the plurality of light shielding members, in which the filter is provided so as to cover a part of the notched portion and has a first area having first light transmittance and a second area having second light transmittance lower than the first light transmittance. When the area of the light passing port which is formed by the light shielding members is in a maximum state, a relation (A3<A2<A1) is satisfied assuming that, in the light passing port, A1 indicates an area of a portion which is not covered with the filter, A2 indicates an area of a portion covered with the first area of the filter, and A3 indicates an area of a portion covered with the second area of the filter.

9 Claims, 8 Drawing Sheets

LIGHT AMOUNT ADJUSTING APPARATUS AND OPTICAL APPARATUS HAVING THE SAME

BACKGROUND OF THE INVENTION

1. Field of the Invention

The invention relates to a light amount adjusting apparatus which is used in an image pickup apparatus such as video camera, digital still camera, or the like and to an optical apparatus having such a light amount adjusting apparatus.

2. Related Background Art

A light amount adjusting apparatus for adjusting a light amount upon photographing is used in an image pickup apparatus such as a video camera or the like. FIG. 10 shows a construction of such a conventional light amount adjusting apparatus. According to such an apparatus, two aperture blades are linearly driven in the opposite directions, thereby enabling an aperture opening diameter to be changed.

In FIG. 10, reference numeral 400 denotes an aperture driving source (motor). An output axis 401 is rotated by supplying a current to a coil of the motor 400. An interlocking lever 402 is integratedly fixed to the output axis 401. The lever 402 has blade interlocking pins 403 and 404 at positions which are away from a rotary axis at a same distance R, respectively.

Reference numerals 405 and 406 denote aperture blades. An aperture opening 413 is formed by those two aperture blades. An ND filter 414 is integratedly adhered and fixed to the aperture blade 406. A part of the aperture opening 413 is covered with the ND filter 414.

Reference numeral 415 denotes an optical axis. Hole portions 407 and 408 adapted to be fitted to the foregoing blade interlocking pins 403 and 404 are formed in the aperture blades 405 and 406, respectively. Thus, the interlocking lever 402 and aperture blades 405 and 406 are interlocked.

Long hole portions 409 and 412 of the aperture blades 405 and 406 are guided by guide pins formed on an aperture base (not shown), so that the aperture blades 405 and 406 are moved in the guiding direction in association with the rotation of the interlocking lever 402, thereby enabling the aperture opening diameter to be varied.

For example, when the interlocking lever 402 is rotated in the direction shown by an arrow 416 in the diagram, the blade interlocking pin 404 moves downward and the blade interlocking pin 403 moves upward. In association with it, the aperture blade 406 moves downward and the aperture blade 405 moves upward, so that the aperture opening diameter (that is, an area of aperture opening) changes in such a direction as to increase more. So long as the rotating direction of the interlocking lever 402 is opposite to the direction of the arrow 416, the aperture opening diameter changes in such a direction as to decrease more.

When the aperture opening diameter decreases, a light diffraction phenomenon occurs easily.

Therefore, in order to remove an adverse influence by such a diffraction on the small aperture side, in the light amount adjusting apparatus of FIG. 10, the ND filter 414 is attached to the aperture blade 406. The occurrence of the diffraction phenomenon is prevented by reducing light transmittance as well as the reduction of the aperture opening diameter.

However, in the light amount adjusting apparatus of the construction such that the ND filter is attached to the aperture blade, in the case where an F value at which the small aperture diffraction occurs becomes brighter in a recent image pickup device such as a CCD or the like having very small pixels, it is necessary to further decrease the transmittance of the ND filter. In case of using the ND filter whose transmittance is further decreased, there is a new problem such that an illuminance variation occurs in a picture plane in a state of the opening diameter where the ND filter covers almost the half of the aperture opening.

As mentioned above, hitherto, although the ND filter has been provided for the aperture blade in order to eliminate an image deterioration due to the light diffraction that is caused in case of the small aperture, it is impossible to avoid the illuminance variation and the resolution deterioration in association with the miniaturization of the image pickup device such as a CCD or the like and the realization of a high density of the pixels thereof.

SUMMARY OF THE INVENTION

It is an object of the invention to provide a light amount adjusting apparatus which can make an optimum light amount adjustment in an image pickup apparatus by preventing an illuminance variation in a picture plane and a deterioration in picture quality due to a light diffraction in case of a small aperture.

To accomplish the above object, according to the invention, there is provided a light amount adjusting apparatus comprising:

a driving source;

a plurality of light shielding members each having a notched portion adapted to form a light passing port, in which the light shielding member is moved by being driven by the driving source to thereby vary an area of the light passing port which is formed in the notched portion; and at least one filter provided for the notched portions of the plurality of light shielding members, in which the filter is provided so as to cover a part of the notched portion and has a first area having first light transmittance and a second area having second light transmittance lower than the first light transmittance, wherein when the area of the light passing port which is formed by the light shielding members is in a maximum state, a relation $$A3 < A2 < A1$$

is satisfied assuming that, in the light passing port, an area of a portion which is not covered with the filter is set to A1, an area of a portion covered with the first area of the filter is set to A2, and an area of a portion covered with the second area of the filter is set to A3.

According to the invention, there is also provided a light amount adjusting apparatus comprising:

a driving source;

a plurality of light shielding members each having a notched portion adapted to form a light passing port, in which the light shielding member is moved by being driven by the driving source to thereby vary an area of the light passing port which is formed in the notched portion; and at least one filter provided for the notched portions of the plurality of light shielding members, in which the filter is provided so as to cover a part of the notched portion and has a first area having first light transmittance and a second area having second light transmittance lower than the first light transmittance in order from a center of the light passing port toward a periphery thereof, wherein in a state where the whole light passing port which is formed by the light shielding members is covered with the filter, when the area of the light passing port is in a maximum state, a relation $$A5 < A4$$

is satisfied assuming that, in the light passing port, an area of a portion covered with the first area of the filter is set to A4, and an area of a portion covered with the second area of the filter is set to A5.

The above and other objects and features of the present invention will become apparent from the following detailed description and the appended claims with reference to the accompanying drawings.

DETAILED DESCRIPTION OF THE PREFERRED EMBODIMENTS (Fundamental Concept)

A fundamental idea common to an embodiment of the invention and its effects will be first described with reference to FIGS. 1A, 1B, and 1C.

Figure 1A:
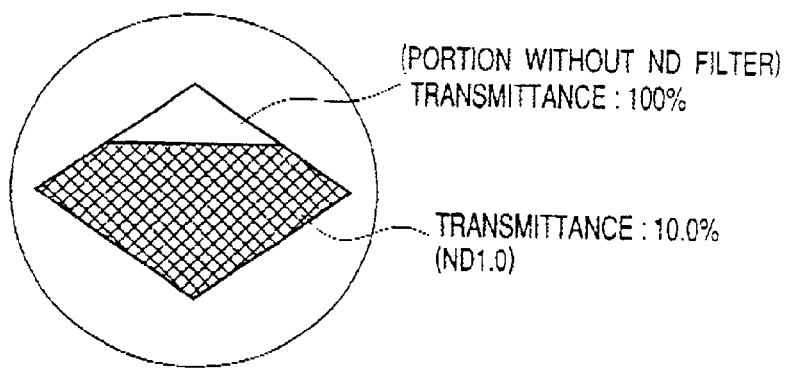
FIGS. 1A, 1B and 1C are explanatory diagrams of a fundamental concept of the invention.
Figure 1B:
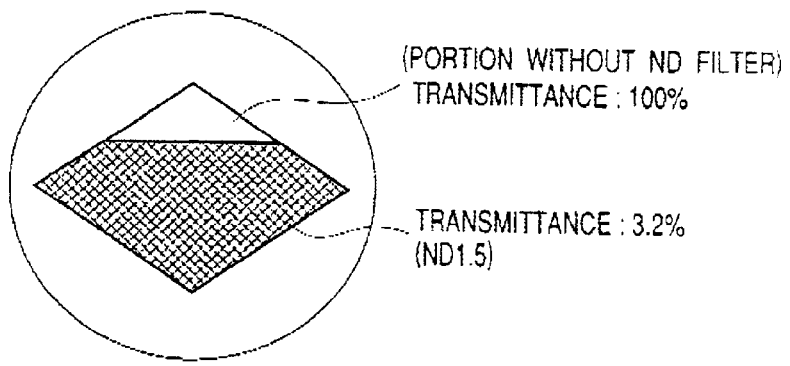
Figure 1C:
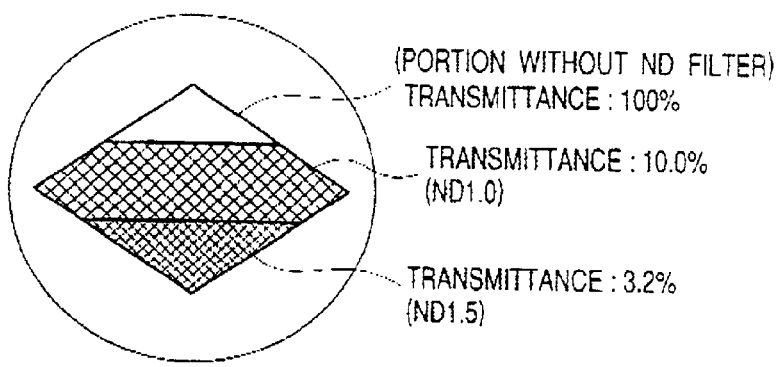

Each of FIGS. 1A to 1C shows a state where an aperture opening (light passing port) of a rhombus is set to an intermediate opening area between a maximum (open) opening area and a full-closed (opening area is equal to zero) state. Each diagram shows a state where a through portion which is not covered with an ND filter and a portion covered with the ND filter exist in the intermediate opening.

FIG. 1A is a diagram showing the light passing port in a conventional light amount adjusting apparatus. In FIG. 1A, the ND filter having transmittance of 10% covers the half or more portion of the aperture opening, and the through portion without the ND filter remains in the upper portion of the ND portion.

It is now assumed that the illuminance variation mentioned above does not occur in this state or, even if it occurred, its level is so low that there is no problem.

In case of the light amount adjusting apparatus shown in FIG. 1A, in a range of the ordinary photographing situation, for example, in a photographing state like an outdoor photographing in a fine weather or the like, the apparatus easily reaches from a state of the intermediate opening of the light passing port of FIG. 1A to a small aperture state where the opening is further reduced, that is, an Image deterioration due to the light diffraction occurs.

Therefore, as a countermeasure against it, as shown in FIG. 1B showing the conventional light amount adjusting apparatus, transmittance of the ND filter is reduced (is made dense) from 10% in FIG. 1A to 3.2%. In this case, although it is possible to reduce an appearance frequency of the problem such that "the aperture soon becomes small and the image deterioration occurs" which the light amount adjusting apparatus in FIG. 1A has, the illuminance variation occurs.

As a countermeasure against them, therefore, the ND filter is divided into a plurality of (two in the diagram) density areas as shown in FIG. 1C showing a light amount adjusting apparatus of the invention. As mentioned above, by dividing the inside of the aperture opening into the through portion, the portion covered with an ND filter having the transmittance of 10%, and the portion covered with an ND filter having the transmittance of 3.2%, it is possible to make it difficult to see the illuminance variation of the picture plane and the occurrence of the image deterioration due to the diffraction in case of the small aperture can be also reduced.

A more specific embodiment of the invention will now be described.

Figure 2:
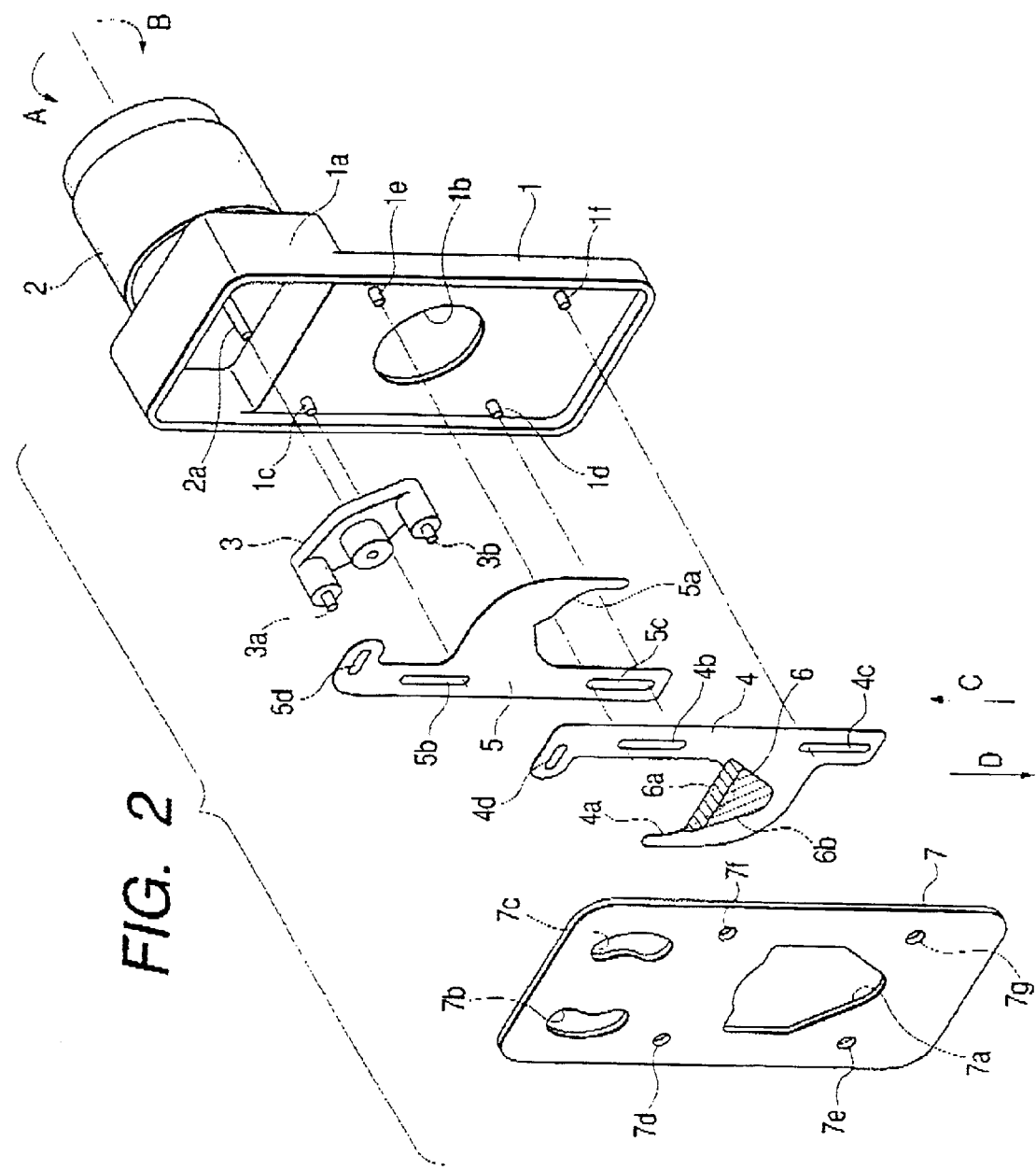
FIG. 2 is an exploded perspective view of a light amount adjusting apparatus as an embodiment of the invention.
Figure 3:
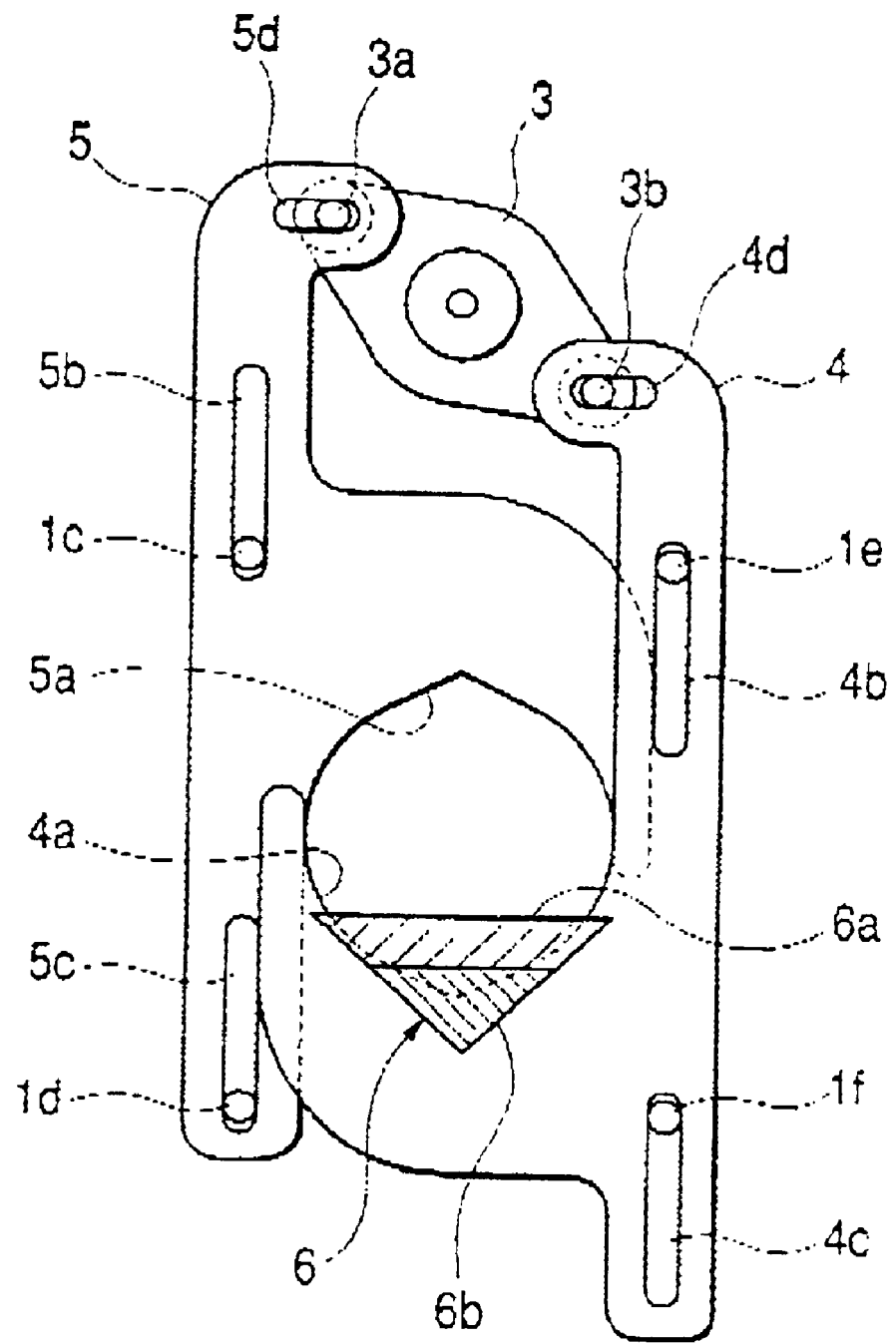
FIG. 3 is a front view of the light amount adjusting apparatus as an embodiment of the invention.

FIG. 2 is a perspective view showing the embodiment of the light amount adjusting apparatus of the invention. FIG. 3 is a front view with a part of FIG. 2 omitted.

In FIGS. 2 and 3, reference numeral 1 denotes a supporting member. A lever enclosing portion 1a is formed in the upper portion of the supporting member 1. A motor 2 serving as a driving source is fixed to one surface of the lever enclosing portion 1a. A driving axis 2a of the motor 2 penetrates in the lever enclosing portion 1a. A lever 3 is fixed to the driving axis 2a. An opening 1b of an open diameter serving as a light passing port is formed in the supporting member 1. Guide pins 1c, 1d, 1e, and 1f for guiding the movement of aperture blades are formed in the supporting member 1.

In FIGS. 2 and 3, reference numerals 4 and 5 denote aperture blades. Notched portions 4a and 5a which form the light passing port are formed in the aperture blades 4 and 5. Guide holes 5b and 5c through which the guide pins 1c and 1d of the supporting member 1 are pierced are formed in the aperture blade 5. A long hole 5d through which a driving pin 3a of a lever 3 is pierced is formed in the aperture blade 5. Guide holes 4b and 4c through which the guide pins 1e and 1f of the supporting member 1 are pierced are formed in the aperture blade 4. A long hole 4d through which a driving pin 3b of the lever 3 is pierced is formed in the aperture blade 4. An ND filter (neutral density filter) 6 is adhered to the notched portion 4a of the aperture blade 4 by using, for example, an adhesive agent or the like so as to cover a part of a space portion of the notched portion 4a. The ND filter 6 is formed with a first area 6a having high light transmittance of, for example, 10% and a second area 6*b* having light transmittance of, for example, 3.2% which is lower than that of the first area 6*a*.

Reference numeral 7 denotes a supporting plate. In a state where the aperture blades 4 and 5 and the lever 3 are attached to the supporting member 1, the supporting plate 7 is fixed to the supporting member 1. The supporting plate 7 is formed with: a through hole 7*a* whose dimensions are sufficiently larger than those of the opening 1*b* of the supporting member 1; holes 7*b* and 7*c* through which the driving pins 3*a* and 3*b* of the lever 3 are pierced; and holes 7*d*, 7*e*, 7*f*, and 7*g* through which the guide pins 1*c*, 1*d*, 1*e*, and 1*f* of the supporting member 1 are pierced.

In the light amount adjusting apparatus of the invention constructed as mentioned above, the motor 2 is driven on the basis of brightness information of an image of image pickup information of an object that is photographed by an optical apparatus such as a video camera or the like, which will be explained hereinlater. Since the motor 2 is driven, the lever 3 rotates and the aperture blades 4 and 5 are moved. For example, when the lever 3 rotates counterclockwise, that is, in the direction shown by an arrow A, the aperture blade 5 moves downward in the direction of an arrow D, the aperture blade 4 moves upward in the direction of an arrow C, so that an area of the light passing port which is formed by the notched portions 4*a* and 5*a* of the aperture blades 4 and 5 becomes smaller than that of the light passing port in the open state.

The ND filter of the light amount adjusting apparatus in the embodiment of the invention will be further described in detail.

Figure 4A:
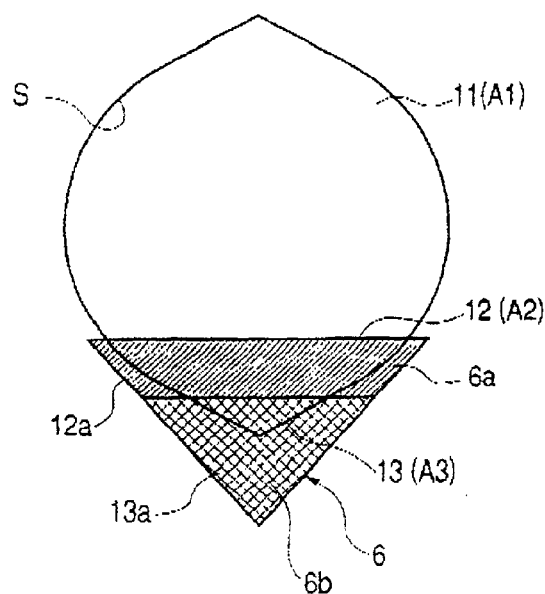
FIGS. 4A and 4B are explanatory diagrams of the light amount adjusting apparatus in the embodiment of the invention.
Figure 4B:
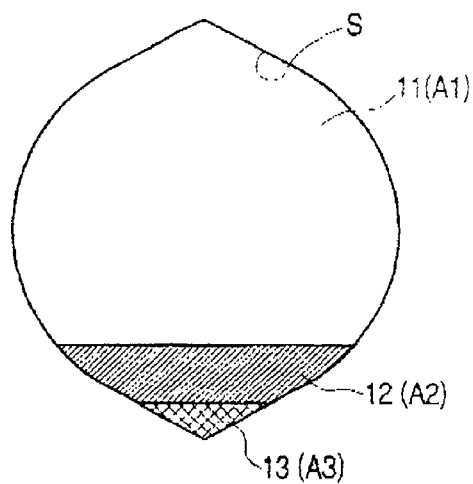

FIGS. 4A and 4B show states of portions around the aperture opening of the light amount adjusting apparatus described in the embodiment of FIGS. 2 and 3. These diagrams illustrate a case where the aperture opening is maximum (open).

In FIG. 4A, in an aperture opening S, reference numeral 11 denotes a through portion which is not covered with the ND filter 6. A1 indicates an area of the through portion 11.

Reference numeral 12 denotes a first light passing area of the first area 6*a* as a low density area having high transmittance (for example, 10%) in the ND filter 6. A2 indicates an area of the portion of the first light passing area 12 in the aperture opening S.

Further, reference numeral 13 denotes a second light passing area of the second area 6*b* as a high density area having low transmittance (for example, 3.2%) in the ND filter 6. A3 indicates an area of the portion of the second light passing area 13 in the aperture opening S. Reference numerals 12*a* and 13*a* denote portions which are overlapped to the aperture blade 4 in the first area 6*a* and the second area 6*b* of the ND filter 6, respectively, that is, adhesive margin portions at the time when the ND filter 6 is adhered to the aperture blade 4.

FIG. 4B shows only the inside of the aperture opening S taken out from FIG. 4A. As will be understood from the diagram, when the aperture opening S is maximum (open), the inside of the aperture opening S is separated into the through portion 11, the first light passing area 12 as a portion covered with the first area 6*a* as a low density area, and the second light passing area 13 as a portion covered with the second area 6*b* as a high density area. The area A1 of the through portion 11, the area A2 of the portion corresponding to the first light passing area 12 as a low density area, and the area A3 of the portion corresponding to the second light passing area 13 as a high density area have the following relation.

$$A3 < A2 < A1 \quad (1)$$

Since the apparatus is constructed as mentioned above, a reduction of the whole light transmittance when the aperture is opened can be lightened to the minimum necessary value and the occurrence of the light distribution variation on the photographed picture plane can be prevented.

Figure 5A:
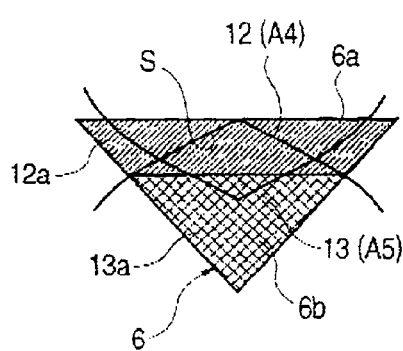
FIGS. 5A and 5B are explanatory diagrams of the light amount adjusting apparatus in the embodiment of the invention.
Figure 5B:
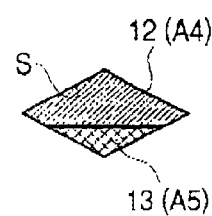

FIGS. 5A and 5B show states of portions around an aperture opening of a light amount adjusting apparatus according to the second embodiment of the invention. These diagrams illustrate a state where the ND filter 6 first fully covers the aperture opening when the aperture blades 4 and 5 are driven from the maximum (open) aperture opening state toward the direction in which it is decreased, in other words, a state where a size at which the aperture opening can have is the maximum size at which the whole aperture opening is covered with the ND filter 6.

In FIG. 5A, reference numeral 12 denotes the first light passing area of the first area 6*a* as a low density area having the high transmittance (for example, 10%) in the ND filter 6. A4 indicates an area of the portion covered with the first light passing portion 12 in the aperture opening S.

Further, reference numeral 13 denotes the second light passing area of the second area 6*b* as a high density area having the low transmittance (for example, 3.2%) in the ND filter 6. A5 indicates an area of the portion covered with the second light passing portion 13 in the aperture opening S. Reference numerals 12*a* and 13*a* denote the portions which are overlapped to the aperture blade 4 in the first area 6*a* and the second area 6*b*, respectively, that is, the adhesive margin portions at the time when the ND filter 6 is adhered to the aperture blade 4.

FIG. 5B shows only the inside of the aperture opening S taken out from FIG. 5A. As will be understood from the diagram, when the aperture opening S is in the above state, the inside of the aperture opening S is separated into the portion covered with the first light passing portion 12 as a low density area and the portion covered with the second light passing portion 13 as a high density area. The area A4 of the portion covered with the first light passing portion 12 and the area A5 of the portion covered with the second light passing portion 13 satisfy the following relation.

$$A5 < A4 \quad (2)$$

There is, consequently, an advantage such that it is possible to prevent a situation that numerical values of changes in light transmission amounts for the movements of the aperture blades 4 and 5 become steep at positions near such a state as mentioned above.

Figure 6:
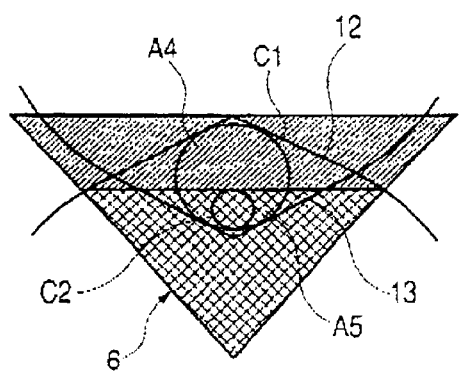
FIG. 6 is an explanatory diagram of an area relation of two density areas of an ND filter in the light amount adjusting apparatus in the embodiment of FIGS. 5A and 5B.

FIG. 6 shows portions around the aperture opening in the same state as that in FIGS. 5A and 5B. In the diagram, C1 denotes a circle which is inscribed to the portion covered with the first light passing area 12 as a low density area in the aperture opening S and C2 denotes a circle which is inscribed to the portion covered with the second light passing area 13 as a high density area in the aperture opening S, respectively.

From the circle C1 or a circle Cx having the same area as that of the area A4 or A5, when the circle C1 or Cx is substituted for an F value, the area A4 of the portion covered with the first light passing portion 12 and the area A5 of the portion covered with the second light passing portion 13 have the following relation.

$$4 \times A5 < A4 \quad (3)$$

where, it is actually desirable to satisfy the relation $$(4 \times A5 < A4) \text{ and } (4 \times A5 = A4).$$

It means that the apparatus has a difference of about two levels or more as an F value for a period of time during which the aperture opening is further narrowed in the reducing direction from a timing when the F value corresponding to FIGS. 5A, 5B, and 6 to a timing when the whole aperture opening is covered with the second light passing portion 13.

There is the following risk, that is, assuming that such a difference is increased (that is, A4 for A5 is increased), a problem such that the areas of the portions covered with the low density area and the high density area of the ND filter increase (the through portion decreases) at the time when the aperture is opened and the light transmittance in case of the open aperture decreases occurs, or a problem such that the F value at the aperture opening which is completely covered with the ND filter becomes a large value and the prevention of the diffraction in case of a small aperture as a purpose of the invention cannot be preferably realized occurs.

When the difference is reduced (that is, A5 for A4 is increased), as described in FIG. 1B, the area of the portion covered with the high density area of the ND filter in the aperture opening increases and there is a risk of occurrence of the illuminance variation.

From the above explanation, if the areas are set to values which are approximate to those shown in the expression (3), they are the optimum areas because no illuminance variation is caused and the adverse influence due to the diffraction in case of the small aperture is prevented.

Although each of the above embodiments has been described as an embodiment of the different light amount adjusting apparatus, one light amount adjusting apparatus can be also constructed so as to satisfy all of the relations shown by the expressions (1) to (3).

A zoom lens for a video camera having the light amount adjusting apparatus of the invention mentioned above will now be described with reference to FIGS. 7A and 7B.

Figure 7A:
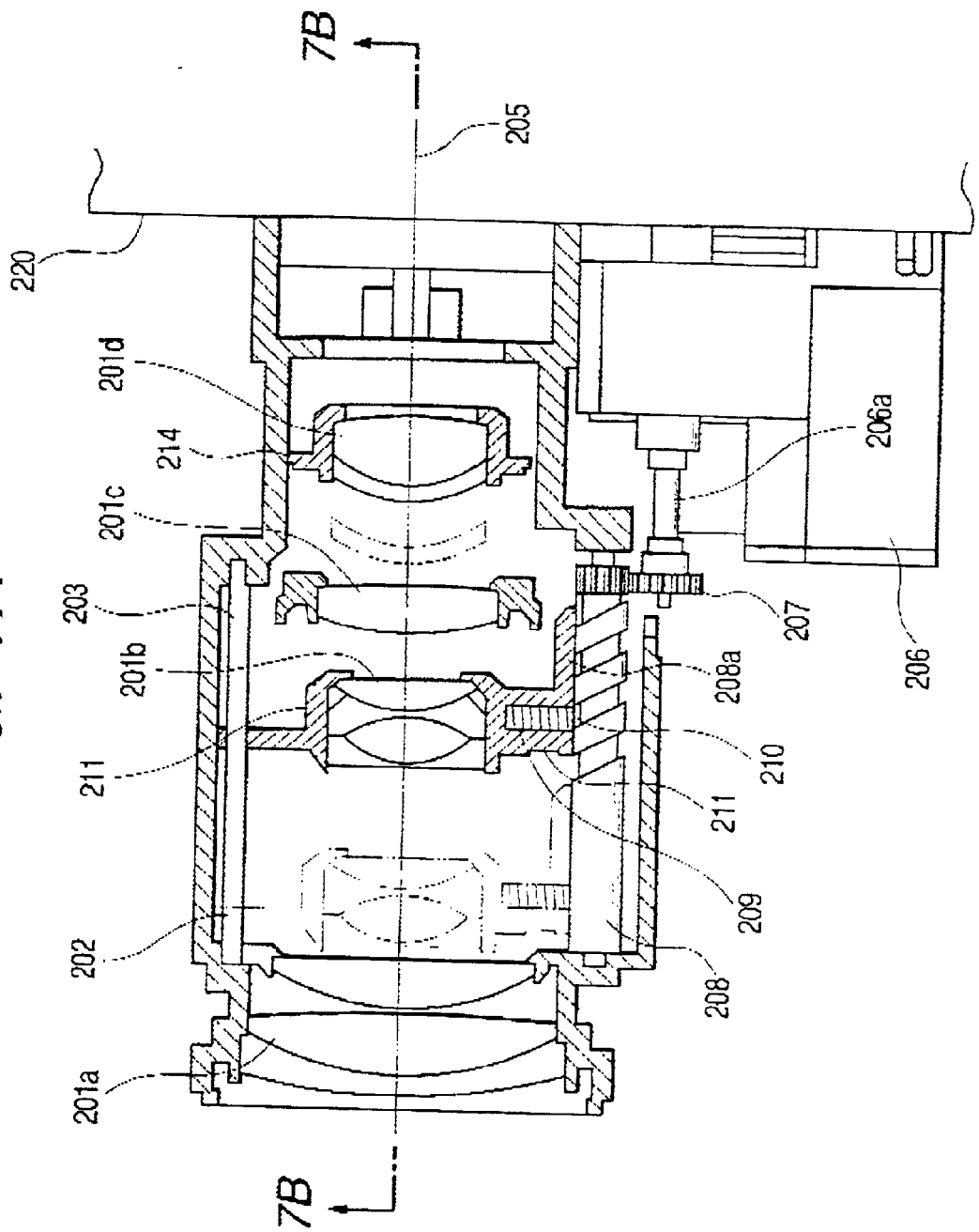
FIGS. 7A and 7B are constructional diagrams of lenses of a video camera having the light amount adjusting apparatus in the embodiment of the invention.
Figure 7B:
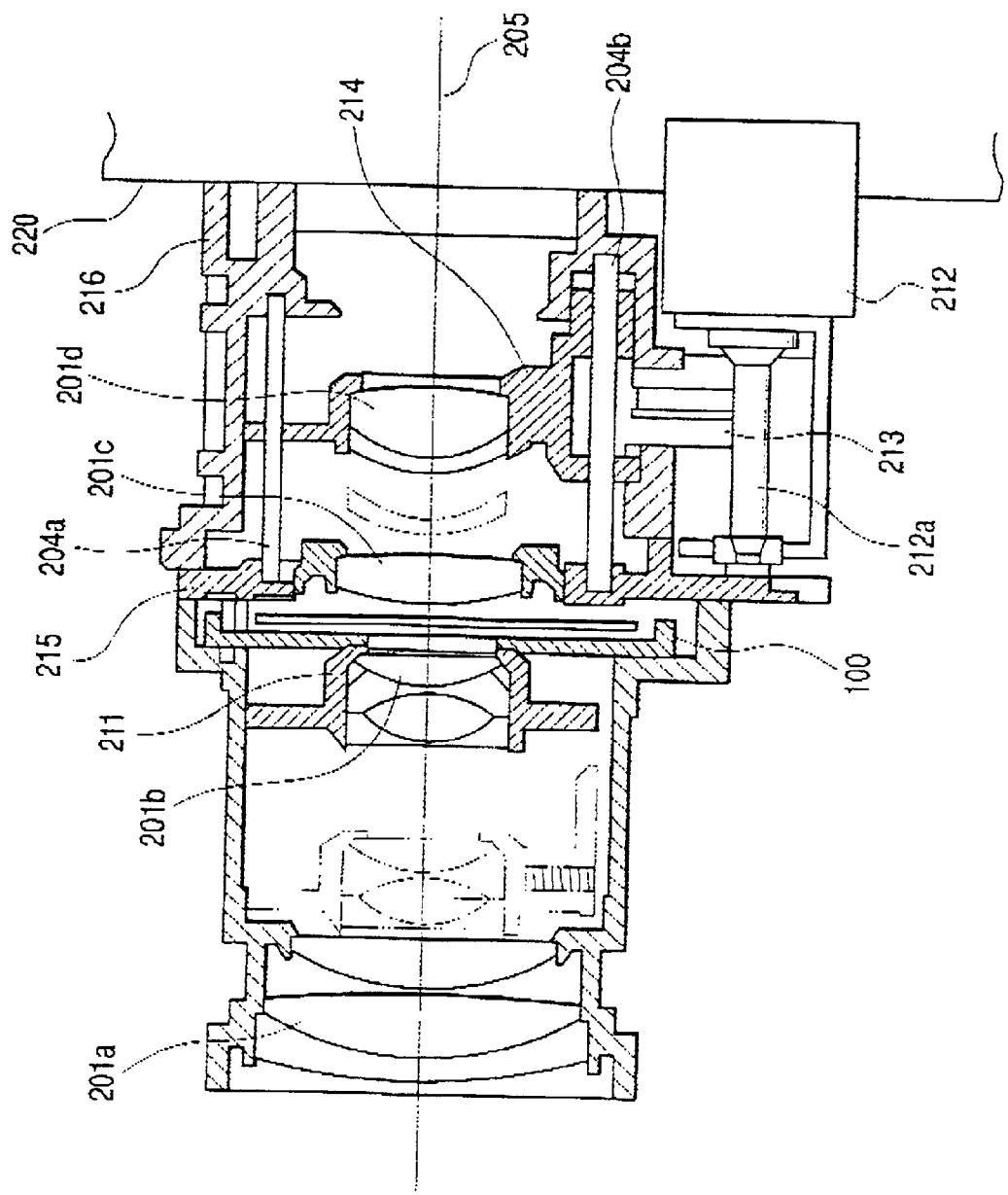

FIGS. 7A and 7B show a mirror barrel structure of a zoom lens with a general 4-group lens construction. FIG. 7B is a cross sectional view taken along the line 7B—7B in FIG. 7A.

Four lens groups 201a to 201d constructing the zoom lens comprise: the fixed front lens 201a; a variator lens group 201b for performing the zooming operation by moving along an optical axis 205; a fixed afocal lens 201c; and a focusing lens group 201d for maintaining a focal plane and performing the focusing operation upon zooming by moving along the optical axis.

Guide bars 203, 204a, and 204b are arranged in parallel with the optical axis 205 so as to guide the lens groups which are moved and prevent the rotation thereof. A DC motor 206 functions as a driving source for moving the variator lens group 201b.

The front lens 201a is held in a front mirror barrel 202. The variator lens group 201b is held in a V moving ring 211. The afocal lens 201c is held in an intermediate frame 215. The focusing lens group 201d is held in an RR moving ring 214.

A light amount adjusting apparatus 100 mentioned above in the invention is attached to the intermediate frame 215. The light amount adjusting apparatus 100 is arranged between the afocal lens 201c and the variator lens group 201b.

The front mirror barrel 202 is fixedly positioned to a rear mirror barrel 216. The guide bar 203 is positioned and supported by both of the mirror barrels 202 and 216 and a guide screw axis 208 is rotatably supported. A rotation of an output axis 206a of the DC motor 206 is transferred to the guide screw axis 208 through a gear train 207, so that the guide screw axis 208 is rotated.

The V moving ring 211 for holding the variator lens group 201b has a pressing spring 209 and a ball 210 adapted to be come into engagement with a screw groove 208a formed in the guide screw axis 208 by a force of the pressing spring 209. The guide screw axis 208 is rotated by the DC motor 206, so that the guide screw axis 208 is moved forward and backward in the optical axial direction while it is being guided and rotation-restricted by the guide bar 203.

The guide bars 204a and 204b are fitted and supported to the rear mirror barrel 216 and the intermediate frame 215 positioned thereto. The RR moving ring 214 can be moved forward and backward in the optical axial direction while it is being guided and rotation-restricted by the guide bars 204a and 204b.

A sleeve portion which is slidably fitted to the guide bars 204a and 204b is formed on the RR moving ring 214 for holding the focusing lens group 201d. A rack 213 is assembled so as to be integrated with the RR moving ring 214 in the optical axial direction.

A stepping motor 212 rotates a lead screw 212a formed integratedly with its output axis. The rack 213 assembled to the RR moving ring 214 is in engagement with the lead screw 212a. When the lead screw 212a rotates, the RR moving ring 214 is moved in the optical axial direction while being guided by the guide bars 204a and 204b.

As a driving source of the variator lens group, a stepping motor can be also used in a manner similar to the driving source of the focusing lens group A main body of a lens mirror barrel for almost hermetically enclosing the lenses and the like is formed by the front mirror barrel 202, intermediate frame 215, and rear mirror barrel 216.

In case of moving the holding frame of the lens group by using such a stepping motor, it is detected by using a photointerrupter or the like that the holding frame is located at one reference position in the optical axial direction and, thereafter, the number of driving pulses which are supplied to the stepping motor is continuously counted, thereby detecting an absolute position of the holding frame.

Figure 8:
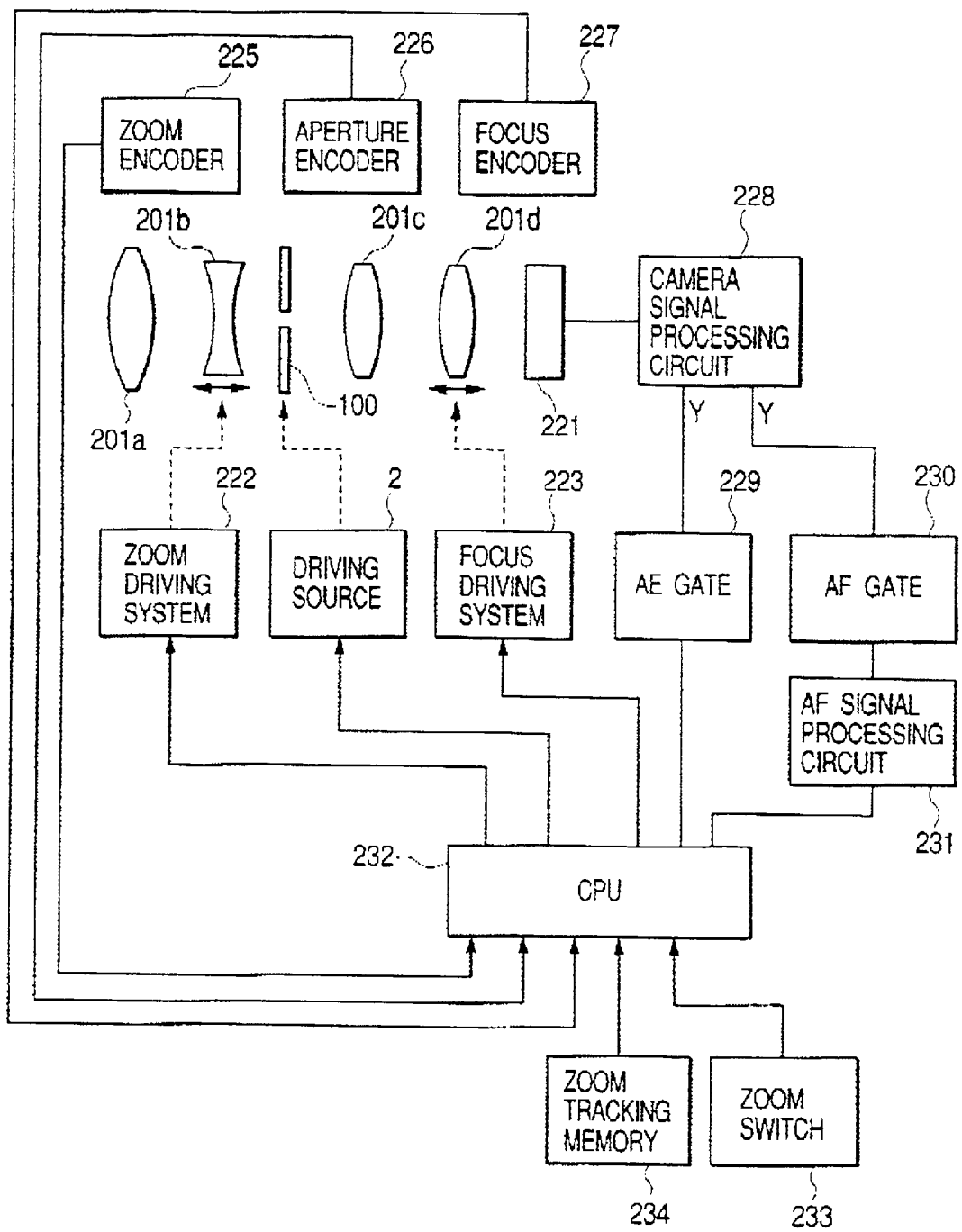
FIG. 8 is a block diagram showing an electric circuit of the video camera having the light amount adjusting apparatus in the embodiment of the invention.

FIG. 8 shows a construction of a camera main body in an image pickup apparatus such as a video camera or the like having the light amount adjusting apparatus of the invention. In the diagram, component elements corresponding to those of the lens mirror barrels described in FIGS. 7A and 7B are designated by the same reference numerals.

Reference numeral 221 denotes a solid state image pickup device such as a CCD or the like and 222 indicates a driving system of the variator lens group 201b. The driving system 222 includes the motor 206 (or stepping motor), gear train 207, guide screw axis 208, and the like.

Reference numeral 223 denotes a driving system of the focusing lens group 201d. The driving system 223 includes the stepping motor 212, lead screw axis 212a, rack 213, and the like.

The motor 2 is a driving source of the light amount adjusting apparatus 100 and is arranged between the variator lens group 201b and afocal lens 201c. The light amount adjusting apparatus 100 is the apparatus described in the embodiment mentioned above and the ND filter 6 described above is used.

Reference numeral 225 denotes a zoom encoder and 227 indicates a focus encoder. These encoders detect absolute positions in the optical axial direction of the variator lens group 201b and focusing lens group 201d, respectively. In case of using a DC motor as a variator driving source, an absolute position encoder such as a volume or the like or a magnetic type encoder is used.

In case of using a stepping motor as a driving source, the method whereby the holding frame is arranged at the reference position and, thereafter, the number of operating pulses which are inputted to the stepping motor is continuously counted as mentioned above is generally used.

Reference numeral 226 denotes an aperture (light amount adjusting apparatus) encoder and a type such that a Hall element is arranged in the aperture driving source 2 such as a motor or the like and a relation between the rotating positions of a rotor and a stator is detected or the like is used.

Reference numeral 232 denotes a CPU for controlling the camera and 228 indicates a camera signal processing circuit for performing processes such as predetermined amplification, gamma correction, and the like to an output of the solid state image pickup device 221. A contrast signal of a video signal subjected to those predetermined processes passes through an AE gate 229 and an AF gate 230. That is, an extracting range of an optimum signal for exposure decision and focusing operation in the whole picture plane is set by those gates. There is a case where sizes of those gates are variable or a plurality of gates are provided.

Reference numeral 231 denotes an AF signal processing circuit for processing an AF signal for AF (automatic focusing operation) and forming one or a plurality of outputs regarding high frequency components of the video signal; 233 a zoom switch; and 234 a zoom tracking memory. The zoom tracking memory 234 stores information of a focusing lens position to be set in accordance with a distance to an object to be photographed and a position of the variator lens upon zooming. A memory in the CPU 232 can be also used as a zoom tracking memory.

For example, when the zoom switch 233 is operated by the photographer, the CPU 232 drives the zoom driving system 222 and focus driving system 223 in a manner such that a predetermined positional relation between the variator lens and the focusing lens which was calculated on the basis of information in the zoom tracking memory 234 is held, that is, in a manner such that the present absolute position in the optical axial direction of the variator lens as a detection result of the zoom encoder 225 coincides with the calculated position of the variator lens to be set and the present absolute position in the optical axial direction of the focusing lens as a detection result of the focus encoder 227 coincides with the calculated position of the focusing lens to be set, respectively.

In the automatic focusing operation, the CPU 232 drives the focus driving system 223 in a manner such that an output of the AF signal processing circuit 231 indicates a peak.

Further, to obtain a proper exposure, the CPU 232 sets an average value of an output of a Y signal which passed through the AE gate 229 to a predetermined value, drives the aperture driving source 2 so that an output of the aperture encoder 226 is set to such a predetermined value, and moves the aperture blades of the light amount adjusting apparatus 100, thereby controlling a diameter of the opening as a light passing port.

A control of the light amount adjusting apparatus in the foregoing image pickup apparatus will be further described.

Figure 9:
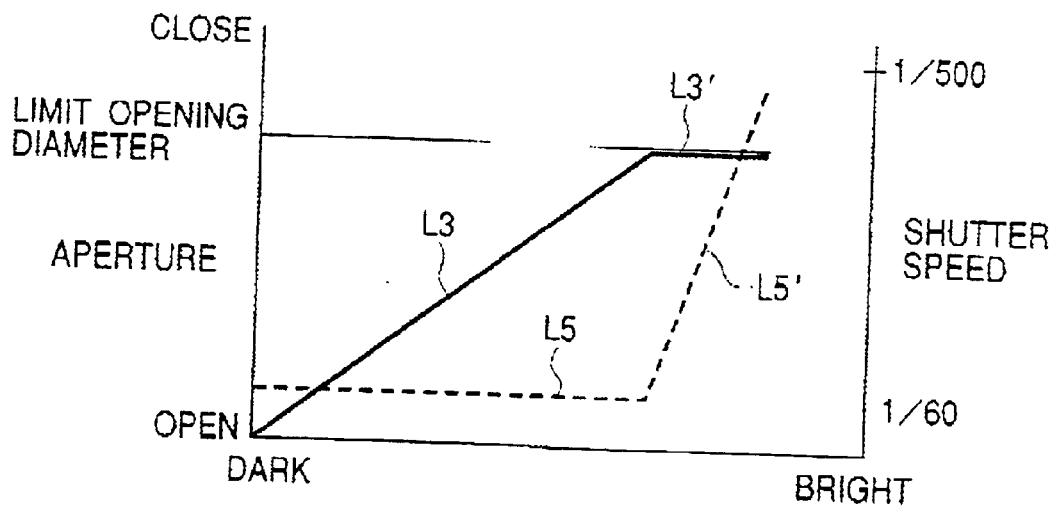
FIG. 9 is a graph showing a relation among a brightness of an object to be photographed, an aperture opening diameter, and a shutter speed in an image pickup apparatus having the light amount adjusting apparatus in the embodiment of the invention.
Figure 10:
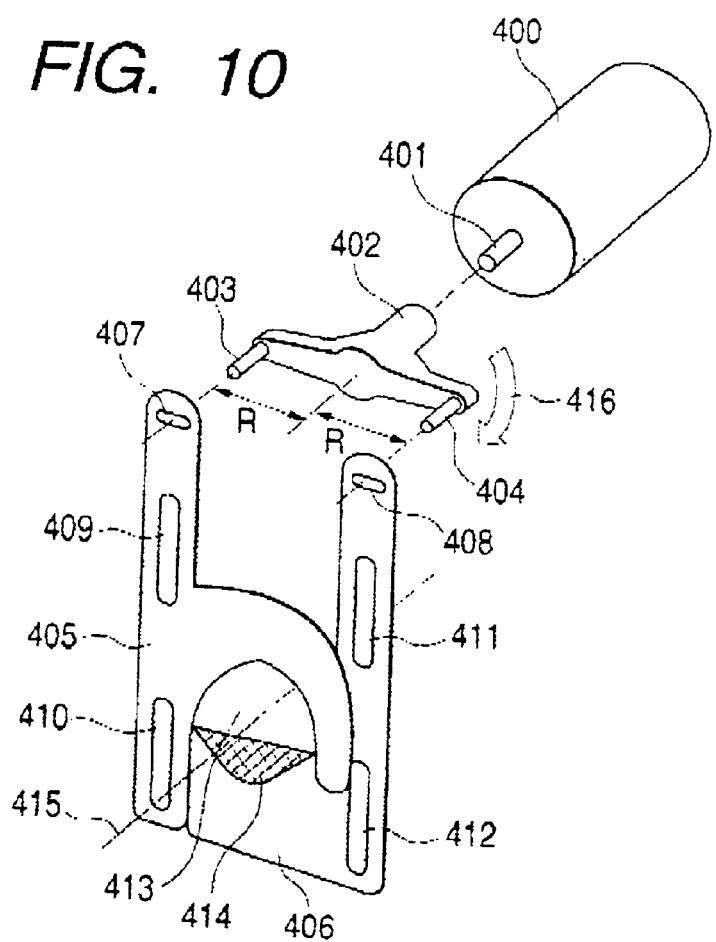
FIG. 10 is an exploded perspective view of a conventional aperture apparatus.

FIG. 9 shows relations among a brightness (axis of abscissa) of the object in the image pickup apparatus having the light amount adjusting apparatus described in the embodiment, an aperture opening diameter (left axis of ordinate) of the light amount adjusting apparatus, and a shutter speed (right axis of ordinate) thereof.

In the diagram, a solid line L3 indicates a diameter of the aperture opening as a light passing port which is formed by the aperture blades 4 and 5 of the light amount adjusting apparatus 100, that is, an aperture opening diameter (area of opening) according to the brightness. A broken line L5 denotes a charge accumulating time (shutter speed) into the CCD 221 according to the brightness.

The light amount adjusting apparatus 100 is controlled by the CPU 232 in a manner such that the aperture opening diameter decreases as the brightness of the object increases from the dark side. In this instance, the charge accumulating time (shutter speed) of the CCD 221 is a long accumulating time (for example, 1/60 second) and is almost a constant time.

When the aperture opening diameter of the light amount adjusting apparatus 100 reaches the diameter set as a "limit opening diameter" in accordance with a change in brightness of the object during the photographing operation, even if the object becomes brighter than that brightness, there is a fear of occurrence of a deterioration of resolution due to the small aperture diffraction. Therefore, the light amount adjusting apparatus 100 is controlled by the CPU 232 in a manner such that the "limit opening diameter" is maintained (L3') without executing a process for further reducing the aperture opening diameter by driving the light amount adjusting apparatus 100. The CPU 232 controls the apparatus in a manner such that the charge accumulating time of the CCD 221 becomes shorter (the shutter speed is raised) (L5') as the object becomes brighter in excess of the brightness corresponding to the "limit opening diameter". Thus, the optimum exposure can be derived even for a particularly bright object.

The "limit opening diameter" mentioned above is an aperture opening diameter which is determined in accordance with a degree of occurrence of the small aperture diffraction or the like in a state where the whole aperture opening is covered with the second area 6b as a high density area in the ND filter 6.

In the image pickup apparatus for making the control by using the CPU 232 as mentioned above, the information of the moving position of the "limit opening diameter" is converted into, for example, a driving amount of the aperture blade in which the aperture opening state is used as a reference and stored into the memory. When a movement amount in which the driving amount from the opening state of the aperture blade reaches the stored moving position is detected through the encoder, the CPU 232 discriminates whether an over-exposure has occurred in this situation or not in accordance with the detection information and a luminance signal of the video signal obtained by passing through the AE gate (refer to FIG. 8). If it is determined that the over-exposure occurs, the CPU controls the apparatus so as to reduce the charge accumulating time of the CCD 221 (raise the shutter speed).

Although the embodiments have been described above with respect to the case where the ND filter 6 has the two density areas, the invention can be also applied to a case where the ND filter has three or more density areas. In this case, the invention can be also applied with respect to two adjacent ND areas, and a relation such that the area of the high density area is smaller than that of the low density area is obtained in a manner similar to each of the above embodiments.

As described above, according to the invention, it is possible to provide a light amount adjusting apparatus in which the problems which are caused in association with the miniaturization of the image pickup device and the realization of a high pixel density, that is, the illuminance variation in the picture plane and the deterioration of the picture quality due to the light diffraction in case of the small aperture can be prevented and the optimum exposure control in the image pickup apparatus can be made.

The aperture blade of the light amount adjusting apparatus is driven only in a range from the opening diameter in the open state to the limit opening diameter, and the apparatus is controlled in a manner such that the charge accumulating time of the CCD 221 is reduced as the object becomes brighter in excess of the brightness corresponding to the limit opening diameter. Therefore, the optimum exposure control can be made even in particularly the bright state while preventing the deterioration of the picture quality due to the small aperture diffraction and the illuminance variation in the picture plane.

What is claimed is:

1. A light amount adjusting apparatus comprising:
a driving source;
a plurality of light shielding members each having a notched portion, said plurality of light shielding members being adapted to form a light passing port, in which a light shielding member of said plurality of light shielding members is moved by being driven by said driving source to thereby vary an area of said light passing port which is formed by said notched portions of said plurality of light shielding members; and
a filter provided for said notched portion of a light shielding member of said plurality of light shielding members, in which said filter is provided so as to cover a part of said notched portion and has a first area having first light transmittance and a second area having second light transmittance lower than said first light transmittance in order from a center of said light passing port toward a periphery thereof,
wherein in a state where the whole light passing port which is formed by said light shielding members is covered with said filter, when the area of said light passing port is in a maximum state, a relation $$A5<A4$$

is satisfied assuming that, in said light passing port,
an area of a portion covered with said first area of said filter is set to A4, and
an area of a portion covered with said second area of said filter is set to A5,
wherein said areas A5 and A4 satisfy a relation $$4 \times A5 < A4.$$

2. A light amount adjusting apparatus comprising:
a driving source;
a plurality of light shielding members each having a notched portion, said plurality of light shielding members being adapted to form a light passing port, in which a light shielding member of said plurality of light shielding members is moved by being driven by said driving source to thereby vary an area of said light passing port which is formed by said notched portions of said plurality of light shielding members; and
a filter provided for said notched portion of a light shielding member of said plurality of light shielding members, in which said filter is provided so as to cover a part of said notched portion and has a first area having first light transmittance and a second area having second light transmittance lower than said first light transmittance in order from a center of said light passing port toward a periphery thereof,
wherein when the area of said light passing port which is formed by said light shielding members is in a maximum state, a relation $$A3<A2<A1$$

is satisfied assuming that, in said light passing port,
an area of a portion which is not covered with said filter is set to A1,
an area of a portion covered with the first area of said filter is set to A2, and
an area of a portion covered with the second area of said filter is set to A3, and
further, in a state where the whole light passing port which is formed by said light shielding members is covered with said filter, when the area of said light passing port is in a maximum state, a relation $$A5<A4$$

is satisfied assuming that, in said light passing port,
an area of a portion covered with said first area of said filter is set to A4, and
an area of a portion covered with said second area of said filter is set to A5,
wherein said areas A5 and A4 satisfy a relation $$4 \times A5 < A4.$$

3. A light amount adjusting apparatus comprising:
a driving source;
a plurality of light shielding members each having a notched portion, said plurality of light shielding members being adapted to form a light passing port, in which a light shielding member of said plurality of light shielding members is moved by being driven by said driving source to thereby vary an area of said light passing port which is formed by said notched portions of said plurality of light shielding members; and
a filter provided for said notched portion of a light shielding member of said plurality of light shielding members, in which said filter is provided so as to cover a part of said notched portion and has a plurality of areas each having different light transmittance,
wherein in a state where the whole light passing port which is formed by said light shielding members is covered with said filter, when the area of said light passing port is in a maximum state, a relation $$A5<A4$$

is satisfied assuming that, in said light passing port,
an area of a portion covered with said area having highest light transmittance of said filter is set to A4, and
an area of a portion covered with said area having lowest light transmittance of said filter is set to A5,
wherein said areas A5 and A4 satisfy a relation $$4 \times A5 < A4.$$

4. A light amount adjusting apparatus comprising:
a driving source;
a plurality of light shielding members each having a notched portion, said plurality of light shielding members being adapted to form a light passing port, in which a light shielding member of said plurality of light shielding members is moved by being driven by said driving source to thereby vary an area of said light passing port which is formed by said notched portions of said plurality of light shielding members; and a filter provided for said notched portion of a light shielding member of said plurality of light shielding members, in which said filter is provided so as to cover a part of said notched portion and has a plurality of areas each having different light transmittance, wherein when the area of said light passing port which is formed by said light shielding members is in a maximum state, a relation $$A3<A2<A1$$

is satisfied assuming that, in said light passing port, an area of a portion which is not covered with said filter is set to A1, an area of a portion covered with the area having highest light transmittance of said filter is set to A2, and an area of a portion covered with the area having lowest light transmittance of said filter is set to A3, and further, in a state where the whole light passing port which is formed by said light shielding members is covered with said filter, when the area of said light passing port is in a maximum state, a relation $$A5<A4$$

is satisfied assuming that, in said light passing port, an area of a portion covered with said area having highest light transmittance of said filter is set to A4, and an area of a portion covered with said area having lowest light transmittance of said filter is set to A5, wherein said areas A5 and A4 satisfy a relation $$4 \times A5 < A4.$$

5. An optical apparatus having a light amount adjusting apparatus, comprising:

a driving source;

a plurality of light shielding members each having a notched portion, said plurality of light shielding members being adapted to form a light passing port, in which a light shielding member of said plurality of light shielding members is moved by being driven by said driving source to thereby vary an area of said light passing port which is formed by said notched portions of said plurality of light shielding members; and a filter provided for said notched portion of a light shielding member of said plurality of light shielding members, in which said filter is provided so as to cover a part of said notched portion and has a first area having first light transmittance and a second area having second light transmittance lower than said first light transmittance in order from a center of said light passing port toward a periphery thereof, wherein in a state where the whole light passing port which is formed by said light shielding members is covered with said filter, when the area of said light passing port is in a maximum state, a relation $$A5<A4$$

is satisfied assuming that, in said light passing port, an area of a portion covered with said first area of said filter is set to A4, and an area of a portion covered with said second area of said filter is set to A5, wherein said areas A5 and A4 satisfy a relation $$4 \times A5 < A4.$$

6. An optical apparatus having a light amount adjusting apparatus, comprising:

a driving source;

a plurality of light shielding members each having a notched portion, said plurality of light shielding members being adapted to form a light passing port, in which a light shielding member of said plurality of light shielding members is moved by being driven by said driving source to thereby vary an area of said light passing port which is formed by said notched portions of said plurality of light shielding members; and a filter provided for said notched portion of a light shielding member of said plurality of light shielding members, in which said filter is provided so as to cover a part of said notched portion and has a first area having first light transmittance and a second area having second light transmittance lower than said first light transmittance in order from a center of said light passing port toward a periphery thereof, wherein when the area of said light passing port which is formed by said light shielding members is in a maximum state, a relation $$A3<A2<A1$$

is satisfied assuming that, in said light passing port, an area of a portion which is not covered with said filter is set to A1, an area of a portion covered with the first area of said filter is set to A2, and an area of a portion covered with the second area of said filter is set to A3, and further, in a state where the whole light passing port which is formed by said light shielding members is covered with said filter, when the area of said light passing port is in a maximum state, a relation $$A5<A4$$

is satisfied assuming that, in said light passing port, an area of a portion covered with said first area of said filter is set to A4, and an area of a portion covered with said second area of said filter is set to A5, wherein said areas A5 and A4 satisfy a relation $$4 \times A5 < A4.$$

7. An optical apparatus having a light amount adjusting apparatus, comprising:

a driving source;

a plurality of light shielding members each having a notched portion, said plurality of light shielding members being adapted to form a light passing port, in which a light shielding member of said plurality of light shielding members is moved by being driven by said driving source to thereby vary an area of said light passing port which is formed by said notched portions of said plurality of light shielding members; and a filter provided for said notched portion of a light shielding member of said plurality of light shielding members, in which said filter is provided so as to cover a part of said notched portion and has a plurality of areas each having different light transmittance, wherein in a state where the whole light passing port which is formed by said light shielding members is covered with said filter, when the area of said light passing port is in a maximum state, a relation $$A5<A4$$

is satisfied assuming that, in said light passing port, an area of a portion covered with the area having highest light transmittance of said filter is set to A4, and an area of a portion covered with the area having lowest light transmittance of said filter is set to A5, wherein said areas A5 and A4 satisfy a relation $$4 \times A5 < A4.$$

8. An optical apparatus having a light amount adjusting apparatus, comprising:

a driving source;

a plurality of light shielding members each having a notched portion, said plurality of light shielding members being adapted to form a light passing port, in which a light shielding member of said plurality of light shielding members is moved by being driven by said driving source to thereby vary an area of said light passing port which is formed by said notched portions of said plurality of light shielding members; and a filter provided for said notched portion of a light shielding member of said plurality of light shielding members, in which said filter is provided so as to cover a part of said notched portion and has a plurality of areas each having different light transmittance, wherein when the area of said light passing port which is formed by said light shielding members is in a maximum state, a relation $$A3<A2<A1$$

is satisfied assuming that, in said light passing port, an area of a portion which is not covered with said filter is set to A1, an area of a portion covered with the area having highest light transmittance of said filter is set to A2, and an area of a portion covered with the area having lowest light transmittance of said filter is set to A3, and further, in a state where the whole light passing port which is formed by said light shielding members is covered with said filter, when the area of said light passing port is in a maximum state, a relation $$A5<A4$$

is satisfied assuming that, in said light passing port, an area of a portion covered with the area having highest light transmittance of said filter is set to A4, and an area of a portion covered with the area having lowest light transmittance of said filter is set to A5, wherein said areas A5 and A4 satisfy a relation $$4 \times A5 < A4.$$

9. An image pickup apparatus comprising:

a lens including (i) a first light shielding plate having a first notched portion, (ii) a second light shielding plate having a second notched portion, (iii) a filter, fixed onto said second light shielding plate to cover a part of said second notched portion, said filter having a first area having first light transmittance and a second area having second light transmittance, the first light transmittance being higher than the second light transmittance, and (iv) an actuator for moving said first light shielding plate and said second light shielding plate so as to adjust an area of a light passing port formed by said first notched portion and said second notched portion;

a charge accumulation image pickup device; and a controller for controlling a charge accumulation time of said charge accumulation image pickup device, wherein in response to said actuator moving said first light shielding plate and said second light shielding plate to make the area of said light passing port a predetermined smaller area, a whole of said light passing port being covered by the first area and the second area, said controller makes the charge accumulation time shorter in accordance with brightness of an object.

* * * * *

UNITED STATES PATENT AND TRADEMARK OFFICE
CERTIFICATE OF CORRECTION

PATENT NO. : 6,927,798 B2
DATED : August 9, 2005
INVENTOR(S) : Kaneda

It is certified that error appears in the above-identified patent and that said Letters Patent is hereby corrected as shown below:

Title page,
Item [56], References Cited, FOREIGN PATENT DOCUMENTS,
"JP 04345149 A12/1992" should read -- JP 4-345149 A      12/1992 --.

Column 2,
Lines 5 and 13, "case" should read -- the case --.

Column 4,
Line 11, "a fine" should read -- fine --.
Line 14, "Image" should read -- image --.
Line 35, "case" should read -- the case --.

Column 7,
Line 2, "(4xA5<A4) and (4xA5=A4)." should read -- (4xA5<A4) and (4xA5≃A4). --.
Line 15, "case" should read -- the case --.

Column 8,
Line 7, "to be" should read -- to --.
Line 38, "case" should read -- the case --.

Column 9,
Lines 3 and 6 "case" should read -- the case --.

Signed and Sealed this

Twenty-eighth Day of March, 2006

JON W. DUDAS
*Director of the United States Patent and Trademark Office*